3,394,989
ZEOLITE "A" BODIES AND THEIR
PREPARATION
Wilfred Drost, Williamsville, N.Y., assignor to Union
Carbide Corporation, a corporation of New York
No Drawing. Filed Oct. 29, 1963, Ser. No. 319,640
11 Claims. (Cl. 23—112)

ABSTRACT OF THE DISCLOSURE

Zeolite A preforms are prepared by mulling a mixture of kaolin powder and 33–67% zeolite A for 10–200 minutes, adding water, and mulling again for at least 10 minutes. The ratio of the first mulling time to second mulling time is at least 0.25:1 and the combined time is less than 4 hours. The mulled second mixture is formed into a compact body, heated at 600–700° C. for kaolin conversion, and the body is reacted with caustic at 200–100° C. to form additional zeolite A.

---

This invention relates to an improved preformed zeolite "A" body and a method for preparing this body.

Zeolite A is a three-dimensional crystalline aluminosilicate characterized by a framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $O/(Al+Si)=2$.

The formula for zeolite A may be written as follows:

$$1.0 \pm 0.2 M_{2/n}O : Al_2O_3 : 1.85 \pm 0.55 SiO_2 \cdot yH_2O$$

In this formula M represents a metal, $n$ its valence and $y$ may be any value up to 6 depending on the identity of the metal and the degree of dehydration of the crystal.

Zeolite A is characterized by uniformly sized pore openings, as are all molecular sieves. This particular sieve has relatively small pore openings in the range of 3–5 Angstroms, depending on the identity of the structural cations. Zeolite A has been widely used as a selective adsorbent for relatively small molecules in both liquid and gas systems.

Zeolite A was originally synthesized in the form of fine powders, generally of a particle size less than about 10 microns, from standard commercial reactants including sodium silicate, silicic acid, colloidal silica sols, silica gel, alumina and sodium aluminate, as described in U.S. Patent No. 2,882,243, issued Apr. 14, 1959, to R.M. Milton. However, it was not always practical to design and construct separation and adsorption equipment to accommodate crystals of this size, since they cause high pressure drop through fixed beds. Accordingly, it was found desirable to employ a larger zeolite A body or agglomerate rather than the small crystals to achieve high volumetric adsorption capacity and facilitate handling of the adsorbent. In addition to high attrition resistance and crush strength, it was also important that the zeolite A in the body retain substantially all the adsorption capacity, adsorption selectivity and thermal stability characteristics exhibited by the finely divided crystalline material.

For these reasons, a suitable binder material such as clay was used to prepare zeolite A bodies such as spheres, beads and the like, from zeolite A powder. These bodies have found widespread commercial acceptance but are characterized by certain limitations. For example, the binder occupies a portion of the agglomerate volume but performs no adsorptive function; hence, the volumetric adsorption capacity of the agglomerate is limited at least to the extent that the binder is present.

This particular problem has been solved by providing a kaolin-type clay, converting the clay into the amorphous reactive form by calcination, forming the calcined kaolin into a shaped body and reacting the body in an aqueous reactant mixture until crystals of zeolite A are produced in the body. The original shape and dimensions of the preformed body are substantially retained during the reaction step. In this manner, virtually all of the body is converted to the desired crystalline zeolite A, and the body is therefore characterized by extremely high volumetric adsorption capacity.

In spite of this advantage, the commercialization of zeolite A preforms has been limited, primarily due to their limited shattering resistance. That is, when activated (dehydrated) zeolite A preforms are contacted with liquid water, they tend to spall and break up into fragments. This is undoubtedly due to the existence of internal stresses within the preformed body. Such breakup is particularly serious in adsorption service where contact with liquid water may occur occasionally in cyclic adsorption-desorption operation.

It is an object of this invention to provide an improved zeolite A body having the characteristics of high volumetric adsorption capacity, high shattering resistance and high resistance to attrition.

Another object of this invention is to provide a preformed zeolite A body having these characteristics.

A further object is to provide a process for producing this improved zeolite A body which is suitable for large-scale operation and provides a consistently reproducible product of high quality for commercial usage.

According to one embodiment, a method is provided for producing crystalline zeolite A in a preformed body in which a first mixture is prepared consisting essentially of finely-divided non-reactive kaolin-type clay and from about 33 to 67 percent, based on the weight of dry mixture, of finely-divided sodium zeolite A (4A). This first mixture is mulled for a period of between about 10 and 200 minutes. Sufficient water is then rapidly added to the mulled first mixture to provide a second mixture having consistency such that it is formable into a compact body, i.e. between about 34 and 40 wt. percent water. The second mixture is then mulled for a period of at least about 10 minutes, the ratio of the first mulling time to the second mulling time being at least about 0.25:1 and the combined first and second mulling times being less than about 4 hours.

The mulled second mixture is then formed into a compact body as for example by extrusion, and heated at temperature between about 600° and 700° C. for at least about 20 minutes to convert the clay into the reactive amorphous form. Thereafter the body is reacted in an aqueous reactant mixture having in the aggregate, including the body, a composition expressed in terms of oxide mol ratios within the range of:

$Na_2O/SiO_2$ ---------------------------------- 0.8–1.4
$SiO_2/Al_2O_3$ --------------------------------- 1.8–2.2
$H_2O/Na_2O$ ---------------------------------- 30–60 at reaction temperature between about 20° C. and 100° C. until additional crystals of sodium zeolite A are produced in said body. Thus, by employing a relatively short first (dry) mulling step and a succeeding wet mulling step of limited duration and having a defined range of water concentration, an improved zeolite A preform body may be prepared having outstanding characteristics.

Kaolin-type clays or clay minerals have the general composition approximately $$Al_2O_3:2\ SiO_2:2-4\ H_2O$$

which makes such clays preferred for the preparation of zeolite A bodies. However, kaolin-type materials having $SiO_2/Al_2O_3$ ratios in the range of about 1.8 to nearly 2.3 are known, and these also may be used in the practice of this invention. For example, if a low silica content kaolin clay is used, additional reactive silica may be introduced in the form of colloidal silica sol, or alkali metal silicate. On the other hand, if the alumina content of the kaolin is low, additional alumina may be introduced, for example, in the form of sodium aluminate or alum. The additional silica or alumina may be introduced as part of the first mixture and thus is incorporated in the reactant mixture from which additional zeolite A is crystallized to provide the required silica-to-alumina ratio in the range of 1.8 to 2.2.

The kaolin-type or two-layer clays may be described as sheet-like crystalline silicates. Their basic structural unit is an aluminosilicate sheet consisting of a layer of silicon atoms in tetrahedral coordination with oxygen atoms, bonded to a layer of aluminum atoms in octahedral coordination with oxygen or hydroxyl. These sheets are stacked one on top of another to form the small plate-like crystals of the mineral. Representative of the clay minerals which contain this two-layer sheet and which may be used in the process of this invention are: kaolinite, livesite, nacrite, dickite, endellite and halloysite. They differ only in the way that the basic structural sheets are stacked and/or to the extent that inter-layer water molecules are present. Pure kaolinite, ($Al_2O_3$: 2 $SiO_2$: 2 $H_2O$), has the composition by weight:

| | Percent |
|---|---|
| $Al_2O_3$ | 39.56 |
| $SiO_2$ | 46.54 |
| $H_2O$ (combined) | 13.9 |

The data of Table A include analyses of some typical kaolin-type clays found to be suitable in the process of the invention. As may be seen, the molar ratio of $SiO_2/Al_2O_3$ in these examples varies, i.e., 1.9, 2.04 and 2.20, but is within the overall range between about 1.8 and 2.3.

not clearly known nor are the mechanisms of the transitions completely understood. There is, in fact, considerable speculation and disagreement in the literature concerning this matter. When kaolin-containing clays are heated in air for a sufficient length of time, the first of these transitions is observed to begin at about 550° C.–600° C., where the crystalline silicate sheets are apparently altered or disordered, yielding a product which is essentially amorphous to X-rays. This transitions product is sometimes referred to as "meta-kaolin," "metakaolinite," "dehydrated kaolin," or "dehydroxylated kaolinite." Roy et al. [Jour. Amer. Ceram. Soc., 38, 205 (1955)] have defined "metakaolinite" as "a metastable high-free-energy phase in the range 600° C. to 900° C." At about 900° C. another transistion apparently occurs.

As stated hereinabove, the exact nature of the transformed kaolin associated with a thermal treatment at 550°–850° C. is not clearly known, because it is essentially amorphous to X-rays. By "amorphous to X-rays" it is meant that the X-ray spectrometer trace exhibits substantially no sharp diffraction bands and is similar to that obtained for a glass. For reasons given hereinbelow, this transformed kaolin as is used in the process of this invention will be referred to as "reactive kaolin."

Although kaolin-type materials have a chemical composition which makes them adaptable as reactants for the synthesis of crystalline zeolite bodies of the molecular sieve type, such kaolin-type materials must have undergone a particular thermal treatment before being useful, i.e., reactive, in the practice of this invention.

As stated above, the first mixture should consist essentially of kaolin-type clay and from about 33 to 67 percent sodium zeolite A. Needless to say, the naturally-occurring clay is far less expensive than the synthetic crystalline zeolite A, and it would be desirable to prepare the preformed zeolite A bodies solely from kaolin. However, preforms made solely from kaolin have poor shattering resistance and require long conversion (digestion-crystallization) times. Prior to the present invention it was found that incorporation of zeolite powder with the kaolin lessened, but did not provide a solution to the problem of shattering. In practicing the present invention, however, I have found that the employment of at least about 33 percent sodium zeolite A powder minimizes this

TABLE A.—ANALYSES OF TYPICAL KAOLIN-TYPE MATERIALS

| Oxide | Georgia Kaolinite A | | Georgia Kaolinite B | | North Carolina Kaolinite C | | Utah Halloysite | |
|---|---|---|---|---|---|---|---|---|
| | Percent by wt. | Moles | Percent by wt. | Moles | Percent by wt. | Moles | Percent by wt. | Moles |
| $Na_2O$ | 0.2 | | 0.40 | | 0.82 | | 0.1 | |
| $K_2O$ | 0.1 | | 0.43 | | | | | |
| $Al_2O_3$ | 40.2 | 1.00 | 37.20 | 1.00 | 37.2 | 1.0 | 37.3 | 1.00 |
| $SiO_2$ | 45.0 | 1.9 | 44.82 | 2.04 | 48.2 | 2.20 | 41.6 | 1.89 |
| Ign. Loss (as $H_2O$) | 9.4 | 1.33 | 14.68 | 2.23 | 13.1 | 1.99 | 20.0 | 3.04 |
| $TiO_2$ | 2.5 | | 1.26 | | | | | |
| Other | 1.4 | | 1.31 | | 0.78 | | | |
| | 98.8 | | 100.1 | | 100.1 | | 98.9 | |

Kaolin-type clays are also known by such names as "ball clay," "fire clay," "papermaking clay," "filler clay," "coating clay," and "china clay." Commercial kaolins may be contaminated with quartz, fine-grained mica, hydrous micas and sometimes feldspar, but their presence at impurity levels will generally not be detrimental to either the process or the shaped zeolite product. Commercially available kaolin-type materials are, for example, "Avery" clay sold by Harris Clay Company, "Edgar" kaolins, sold by Minerals and Chemicals Corporation, and "Hydrite" kaolins, sold by Georgia Kaolin Company.

Kaolin-type clays or clay minerals when thermally treated appear to undergo several transitions, although the exact natures of the products of such transitions are shattering problem. It is theorized that contact of the mixture with an alkali solution creates internal stresses which are not relieved during formation of the zeolite A crystals. When employed in the method of this invention the sodium zeolite A particles separate the kaolin particles and thereby avoid the buildup of internal stresses since they themselves do not have this characteristic. More than about 67 percent zeolite A in the first mixture is undesirable because it does not appreciably improve the final product shattering resistance and adds greatly to its cost. The shattering resistance of various types of zeolite A preform bodies (⅛-inch extrusions) is illustrated by Table B. With the exception of the 0% 4A sample, each preform was prepared in accordance with the method of this invention.

TABLE B

| Zeolite 4A In Mixture, Percent | Piece Density, lb./ft.³ | Shattering Loss, Percent | Zeolite 4A In Product, Percent |
|---|---|---|---|
| 0 | 85 | 80 | 89 |
| 30 | | 16 | 72 |
| 40 | 81 | 9 | 89 |
| 50 | 81 | 0 | 92 |
| 80 | 75 | 1 | 100 |

The first mixture may contain water or may be dry. Kaolin-type clays that are commercially available usually contain about 6-9 wt. percent moisture and there is no particular reason for removing it prior to mulling. Also, the zeolite A need not be activated, i.e. dehydrated, prior to use. For large-scale production the zeolite A is preferably supplied to the mixer as a damp mass of fine crystals directly from the filter cloth of the synthesis production line. This form is easier to handle than the dry powder. In order to provide a shatter-resistant zeolite A product, the overall moisture content of the first mixture is preferably less than about 26 wt. percent and most suitably 20-22 wt. percent.

The first mixture is mulled for a period of between about 10 and 200 minutes; as used herein, "mull" refers to kneading, mixing or blending of the mixture so as to obtain a reasonably uniform distribution of the components.

If the duration of the first mulling step is less than about 10 minutes, insufficient time has elapsed for adequate mixing of the kaolin and zeolite A components, hence a relatively low density product is obtained even though the shattering loss might be acceptable. However, if this step is continued for longer than about 200 minutes, the combined first and second mulling times become excessive and the shattering loss again becomes too high for wide commercial use. The probable explanation is that extended intensive mixing, aided by the presence of water, results in particle breakdown and a very close packing of the component particles. After shaping and calcining, reaction of the bodies with alkali metal hydroxide seems to induce strains without a corresponding increase in the volume of the body. An over-densified mass is thus less able to accommodate the rearrangements that occur during crystallization to form additional sodium zeolite A, and subsequently when the activated body is contacted with liquid water. The relationship between first mulling period, density and shatter resistance of the zeolite A preform product is illustrated empirically by the Table D data, discussed hereinafter.

Following the first mulling step, sufficient water is rapidly added to the first mixture to provide a second mixture of a shapable consistency containing between about 34 and 40 wt. percent water. Generally, the addition of water may be completed in about 5 minutes and is preferably carried out at a reasonably uniform rate. If the second mixture contains less than about 34 wt. percent water, it becomes difficult to form the mulled second mixture into a shaped body, as for example by extrusion; an excessively dense product results, with increased shattering loss.

It is desirable that the moisture content of the second mixture not exceed about 40 wt. percent because of the less desirable physical properties observed above this level; density declines, the extruded bodies tend to stick together during handling, and the crush strengths are low. For example, at a moisture content of 41 wt. percent, the mixture was too fluid for proper extrusion; the extrusions were accordingly too weak and of too low density for additional characterization of physical properties. The excellent shattering resistance obtained when the second mixture has a moisture content within the range 34-40 wt. percent is demonstrated by the data of Table C. These data were obtained in a series of tests in which ⅛-inch diameter extruded pellets were prepared from a 50-50 by weight mixture of kaolin clay and sodium zeolite A.

TABLE C.—EFFECT OF SECOND MIXTURE'S MOISTURE CONTENT ON SHATTERING CHARACTERISTICS

| Moisture Content, percent | Shattering Loss, percent | Percent Zeolite A |
|---|---|---|
| 33.0 | 17.1 | 92 |
| 34.5 | 1.8 | 93 |
| 35.5 | 0.9 | 87 |
| 36.5 | 3.7 | 88 |
| 37.0 | 0.4 | 88 |
| 37.5 | 2.9 | |
| 38 | 1.5 | 88 |
| 39 | 5.5 | 95 |
| 40.5 | 11 | 92 |

It has been previously indicated that the second mixture should be mulled for a period of at least 10 minutes, and preferably not less than 15 minutes. This is necessary to obtain adequate mixing and dispersion of the added water.

I have also discovered that a critical relationship exists between the mulling times for the first and second mixtures if the end product is to possess high shattering resistance, satisfactory crush strength, high zeolite A content and reasonably high density. In order to realize suitable volumetric adsorption capacities in the end product, piece density values of at least about 77 lbs./ft.³ are desired. The ratio of the duration of the first mulling period to that of the second mulling period should be at least 1:4, and the combined duration is less than about 4 hours. The lower limit of the combined mulling ("dry" plus "wet") is about 25 minutes, while maintaining a dry-mulling time of at least 10 minutes to achieve acceptable piece density in the preform product. In commercial practice, depending on such factors as batch size and equipment capabilities, the shortest dry and wet mulling times are around 10-15 and 30-40 minutes, respectively. Excessive second or "wet" mulling times were found to produce high shattering losses although the product preform zeolite A had other desirable characteristics, i.e. high density, firmness and high bulk crush strength. On the other hand, short wet-mulling time gives good shattering resistance but a low density pellet, e.g. 71 lb./ft.³. It has been discovered that by first dry mulling a zeolite A-kaolin mix of limited moisture content, a more open structure exhibiting low shattering loss but adequate piece density is achieved. A probable explanation for the relationship between the first and second mulling periods defined by the instant method is that mixing or mulling which is sufficiently intensive to break down clay and molecular sieve particles is believed excessive, as previously indicated. In a "wet mix" state which is characterized by a cohesive mass of clay, zeolite and water, such breakdown can begin in less than an hour. However, in a "dry mix" condition, less water is present and the individual particles flow easier and offer much less resistance to the mixing action. Accordingly in the dry state a much longer mixing time can be used before the occurrence of undesirable particle breakdown.

A series of tests were performed which illustrate the significance of first ("dry") milling time and second ("wet") mulling time in the production of the novel zeolite A preform bodies by the present invention. The data from these tests are summarized in Table D.

TABLE D.—EFFECT OF MULLING TIME ON SHATTERING CHARACTERISTICS

| Run No. | Mulling Period | | | | Shattering Loss, percent | Density, lb./ft.$^3$ | Percent 4A in Product |
|---|---|---|---|---|---|---|---|
| | Dry, Min. | Wet, Min. | Total hr.—min. | Ratio, Dry:Wet | | | |
| 1 | 5 | 10 | 0—15 | 0.5:1 | 1.5 | 69 | 94 |
| 2 | 30 | 15 | 0—45 | 2:1 | 3 | 82 | 89 |
| 3 | 60 | 15 | 1—15 | 4:1 | 0 | 82 | 88 |
| 4 | 90 | 15 | 1—45 | 6:1 | 4 | 84 | 87 |
| 5 | 120 | 15 | 2—15 | 8:1 | 1 | 82 | 87 |
| 6 | 2 | 20 | 0—22 | 0.1:1 | 0 | 71 | 93 |
| 7 | 90 | 20 | 1—50 | 4.5:1 | 4 | 82 | 91 |
| 8 | 180 | 20 | 3—20 | 9:1 | 4 | 82 | 95 |
| 9 | 360 | 20 | 6—20 | 18:1 | 10 | 82 | 94 |
| 10 | 30 | 30 | 1—00 | 1:1 | 3 | 78 | 94 |
| 11 | 210 | 30 | 4—00 | 7:1 | 12 | -------- | 88 |
| 12 | 10 | 40 | 0—50 | 0.25:1 | 7 | 79 | 97 |
| 13 | 3 | 60 | 1—03 | 0.05:1 | 12 | 87 | 92 |
| 14 | 30 | 60 | 1—30 | 0.5:1 | 6 | 78 | 93 |
| 15 | 60 | 60 | 2—00 | 1:1 | 7 | -------- | 94 |
| 16 | 10 | 150 | 2—40 | 0.07 | 10 | 85 | -------- |
| 17 | 3 | 270 | 4—33 | 0.01 | 38 | -------- | -------- |

The invention runs reported in Table D have been arranged with increasing wet mulling times. An inspection of this table reveals that Runs Nos. 1, 6, 9, 11, 13, 16 and 17 are outside the scope of this invention and illustrate the importance of the previously defined and discussed process criticalities. For example, the dry mulling time of Run No. 1 is prohibitively low, only 5 minutes, thereby accounting for the low product density of 69 lb./ft.$^3$. Run No. 6 has the same shortcoming although it should be noted that the shattering loss of both products is minimal. In Runs Nos. 9 and 11 the dry mulling times are so high that the total mixing times are excessive and the shattering loss is high. Run No. 13 fails in two respects, a low dry mulling time and a low dry-to-wet mulling time ratio, thereby accounting for the high shattering loss. Runs 16 and 17 are characterized by low dry-to-wet mulling time ratios, and No. 17 also has a low dry mulling time.

In forming the mulled second mixture into a compact body, any of several techniques may be used as for example molding, extruding, tumbling, drum-rolling, casting, slip-casting, disk-forming, belt-forming, prilling, tableting and briquetting. The following are illustrative of possible shapes of the preform body: beads, spheres, pellets, tablets, briquettes, granules, cylinders, tubes, disks, partitions, toroids, cubes and blocks. Before conducting the shaping step, it may be desirable to intermix small amounts of other materials such as lubricants, extrusion aids, gelling or thickening agents, surface-active agents and the like.

After the preforming step, the compact body is heated at temperature between about 600° and 700° C. for at least about 20 minutes to convert the kaolin into the reactive, amorphous metakaolin form. The temperatures and times at which the conversion is best carried out are interdependent—the higher the temperature, the lower the time required for a given degree of conversion. This thermal treatment time is of course influenced by batch size and by the particular characteristics of the heating device employed, such as an oven, muffle furnace, rotary kiln and the like. However, conversion times of less than about 20 minutes usually produce undesirably large amounts of sodalite-type materials which are not dehydratable to zeolite A. These materials reduce the adsorption capacity per unit volume of the preform body.

The conversion or calcination temperature for the kaolin constituent of the preform body should not exceed about 700° C. as higher temperatures tend to at least partially destroy the crystallinity of the zeoliteA constituent.

After conversion of the kaolin, water and sodium hydroxide are intimately contacted with the calcined preform body in sufficient quantity to form an aqueous reactant mixture having in the aggregate, including the body but not the zeolite A constituent thereof, a composition expressed in terms of oxide mol ratios within the ranges of:

$Na_2O/SiO_2$ _____ 0.8–1.4
$SiO_2/Al_2O_3$ _____ 1.8–2.2
$H_2O/Na_2O$ _____ 30–60

Digestion and crystallization of the shaped body incorporated in the reactant mixture may be accomplished in a single step or two separate steps. When digestion and crystallization are conducted in separate steps, the first or digestion step takes place at temperatures between about 20° and 55° C., and preferably 40°–50° C. for a period of 2–3 hours. Although the nature of the reactions during this step are not clearly understood, it is believed that the system undergoes a type of diffusion or ripening process which prepares or otherwise conditions the reactants for conversion to the desired zeolite A in the second or crystallization step.

The second or crystallization step requires a temperature between about 75 and 100° C. and preferably 80–90° C. for a period of about 4–5 hours to crystallize additional zeolite A. Operation above about 100° C. requires pressure vessels and there is a tendency for the formation of unwanted aluminosilicates such as hydroxysodalite.

After the crystallization step, the zeolite A bodies are separated from the spent reactant or mother liquors by removing the bodies from the crystallization vessel, or by withdrawing the liquors from the vessel or by other means. The spent liquors thus separated may be reused for the next batch of shaped reactive kaolin preforms after adjustment with amounts of reactants to again give a properly proportioned reactant liquor. The zeolite A bodies are then washed, either in the crystallization vessel or in a separate vessel, until the effluent wash water in equilibrium with the zeolite has a pH of between about 9 and 11. Thereafter the bodies are dried, conveniently with circulating air or in a vented oven at a temperature of between about 25° and 150° C. For purposes of characterization of the product by X-ray diffraction and chemical analysis this drying is sufficient. Use of the product in adsorption service requires that the zeolite first be activated or dehydrated by heating to at least about 350° C., and typically 500–600° C. for about 30 minutes.

Intensive agitation of the reactant mixture during digestion and crystallization is not necessary. Gentle circulation of the ambient liquor around the shaped bodies during reaction is sufficient and, in fact, excellent results have been achieved under quiescent conditions.

The overall method of the invention will be more clearly understood by the ensuing description of a preferred embodiment. A first mixture of 50% by weight (activated basis) sodium zeolite A powder and 50% by weight kaolin powder is charged to a mixer and mulled for 60–100 minutes; suitably the overall moisture content of this "dry mix" is 20–22 wt. percent. Enough water is then added in the space of a few minutes to obtain a proper extrudable consistency, e.g. about 37% by weight. The resulting second mixture is then mulled for 15–25 minutes. Next, the mulled second mixture is extruded into firm, smooth pellets, for example, 1/16-inch or 1/8-inch diameter, which are dried and calcined (fired) at a bed temperature of 670° C. for 1/2 hour. The pellets are digested and crystallized in a two-step sequence (molar ratios $Na_2O/SiO_2=1.4$, $SiO_2/Al_2O_3=2$, $$H_2O/Na_2O=40)$$

by (a) circulating 10½% aqueous caustic solution through the pellet bed while maintaining the temperature at 45° C. for 2½ hours, and (b) heating and maintaining the pellet bed-caustic solution bath at a reaction temperature of 85–90° C. for 4½ hours. The product zeolite A pellets are washed for 8 hours, then dried at about 120° C. and finally activated at 575° C. for 20 minutes.

The following Table E lists representative characteristics of sodium zeolite A pellets made in lot sizes ranging from 3 to 30 pounds by the aforedescribed preferred method embodiment:

TABLE E

| Property | Typical | Range |
|---|---|---|
| Shattering Loss, percent | 1 | 0–4 |
| Bulk Crush Strength, percent | 70 | 67–74 |
| Piece Density, lb./ft.³ | 84 | 82–85 |
| Sodium Zeolite A Content, percent | 91 | 89–92 |

As used herein, the term "Shattering Loss" refers to a test procedure used to predict with reasonable certainty the ability of activated zeolite A preform shapes to withstand the action of liquid water. The test procedure indicates the extent to which the absorbent body is weakened under a compressive load after the activated sample has been immersed in water. Briefly, the test method is as follows: A standard quantity of activated bodies is crushed in a cylinder by increasing the pressure to 2000 p.s.i. This crushed material is then screened and the amount remaining on the screen is noted. A second quantity of activated bodies is dropped into water, then reactivated, crushed and screened in the same manner as the first or reference sample. The "shattering loss" is considered to be the loss of strength due to immersion and is reported as the decrease in the amount of material remaining on the screen, expressed as percent. For most adsorption uses of zeolite A preform bodies, the shattering loss as determined by this test should be less than 10% and preferably less than 5%.

The "sodium A content" was based on adsorption capacity of oxygen at −183° C. and 100 mm. Hg. A capacity of 24 wt. percent was used as a standard for pure sodium zeolite A. Adsorption capacity for other fluids may be used as a criteria for evaluating other cationic forms of zeolite A preforms prepared by the method of this invention. For example, in the evaluation of calcium zeolite A (5A) preform bodies the equilibrium capacity for butane at 250 mm. Hg and 25° C. is a convenient reference.

The following examples are representative of the method and product of the invention:

Example 1

A 4-lb. batch of kaolin clay powder was blended with 4 lbs. (dry basis) of sodium zeolite A powder containing 22 wt. percent $H_2O$ in a double-cone blender for one hour. The first mixture was divided into two portions, designated as "A" and "B." Lot "A" was then mixed for 20 minutes in a mulling apparatus, sufficient water being added to provide a second mixture having 36 wt. percent $H_2O$. From this second mixture, 1/8-inch diameter pellets were extruded and then calcined at 700° C. Lot "B" was mulled for 4 hours at a moisture content of 35.4%, water being added as needed to maintain the moisture level. From this mix, 1/8-inch diameter pellets were extruded and calcined at 700° C.

Portions of Lots "A" and "B" were then reacted under identical conditions in a two-step digestion-crystallization method; 0.8 lb. of each lot was placed in small baskets in a container through which 10½% NaOH solution (8 lbs. of solution) circulated continuously. The first or digestion step was at 45° C. for 2½ hours, and the second or crystallization step was at 85° C. for 3½ hours. The resulting sodium zeolite A preform bodies were thoroughly washed, dried and activated. When samples of both products were subjected to the shattering test procedure described above, the results were as follows:

| Lot | Percent Shattering Loss | Percent Sodium Zeolite A |
|---|---|---|
| "A" | 4 | 96.3 |
| "B" | 23 | 92.7 |

These results demonstrate the unexpected improvemnt in shattering resistance characteristic of zeolite A preform bodies prepared by the instant method. That is, a relatively short wet-mixing time (in the case of Lot "A") resulted in a sodium zeolite A preform body having only about one-fifth of the shattering loss of that obtained with the conventional extended wet-mixing period (Lot "B").

Example 2

An 8-lb. batch (Lot "A") of 50 wt. percent (activated basis) sodium zeolite A and 50 wt. percent kaolin clay was dry-mixed in the same double-cone blender for one hour. This first mixture was then transferred to a larger mulling apparatus and mulled (with added water) for one hour at a moisture content of 36 wt. percent. Pellets were then extruded, dried and calcined at 700° C.

A second 8-lb. batch (Lot "B") of the same composition was wet-mulled at the same moisture content for 3½ hours without a previous dry mixing step. Pellets were extruded, dried and calcined as with Lot "A."

Samples (240 grams) of Lots "A" and "B" were converted to sodium zeolite A in sealed ½-gallon glass jars (containing 912 cc. $H_2O$ and 108 grams NaOH) at 45° C. (2½ hours) and at 85° C. (3½ hours). The following data were obtained for evaluation of the pellets.

| Lot | Percent Shattering Loss | Percent Sodium Zeolite A |
|---|---|---|
| "A" | 7 | 93.7 |
| "B" | 38 | 88.6 |

These data demonstrate the importance of a dry-mulling step of limited duration in combination with a wet-mulling step of limited duration, to obtain a product of improved shatter-resistance.

Example 3

A first mixture consisting of 3865 grams of kaolin clay containing 7% moisture, 4910 grams of sodium zeolite A containing 26.0 wt. percent $H_2O$, and 545 cc. of $H_2O$ was dry-mulled for 90 minutes. The overall moisture content of this mixture during the first mulling step was 22.4%. At the end of this step, 2100 cc. of water was quickly added and wet-mulling performed for 20 minutes, the overall moisture content being 36.5%. Pellets of 1/8-inch diameter was then extruded, dried and calcined for ½-hour at 700° C.

Four pounds of these pellets were transferred to the digester where they were contacted with a solution composed of 4 lb. NaOH dissolved in 4 gallons of water. The reactant mixture so obtained was treated for 2½ hours at 45° C. and for 3½ hours at 85° C. to produce sodium zeolite A preform bodies. The latter were washed, dried and activated. Evaluation of samples of the activated product showed a shattering loss of 3.5 wt. percent and a sodium zeolite A content of 91%. Bulk crush strength was 74.1%, piece density was 82 lb./ft.³ and piece crush strength was 67.2 lb.

Example 4

Using a series of steps similar to those of Example 3, 3845 grams of kaolin clay containing 7 wt. percent moisture and 6110 grams of 4A zeolite containing 41 wt. percent $H_2O$ were dry-mulled for two hours, followed by the addition of 1175 grams of $H_2O$. This mixture was mulled for 15 minutes at a measured moisture content of 35.5 wt. percent and then extruded. After digestion and crystallization of the calcined (700° C.) pellets (2½ hours at 45° C. and 3½ hours at 85° C.), using an overall reactant composition defined by the molar ratios of oxides as $Na_2O/SiO_2=1.4$, $$SiO_2/Al_2O_3=2, H_2O/Na_2O=40$$

evaluation of the activated sodium zeolite A product indicated a shattering loss of 0.9%, a piece density of 82 lb./ft.³ and a sodium zeolite A content of 87%.

Although preferred embodiments of the invention have been described in detail, it is to be understood that modifications and variations may be effected without departing from the spirit and scope of the invention. For example, the as-produced sodium zeolite A preform bodies may be cation-exchanged to other forms, e.g. calcium, by contact with a suitable soluble salt solution. It has been found that calcium ion exchange does not have an adverse effect on the shattering-resistance properties of the instant zeolite A preform.

What is claimed is:

1. A method for producing crystalline zeolite A in a preformed body, comprising the steps of providing a first mixture consisting essentially of finely-divided non-reactive kaolin-type clay and from about 33 to 67 percent, based on the weight of dry mixture, of finely-divided sodium zeolite A; mulling said first mixture for a period of between about 10 and 200 minutes; rapidly adding sufficient water to the mulled first mixture to provide a second mixture having consistency such that it is formable into a compact body; mulling said second mixture for a period of at least about 10 minutes, the ratio of the first mulling time to the second mulling time being at least about 0.25:1 and the combined first and second mulling times being less than about 4 hours; forming the mulled second mixture into a compact body; heating said body at temperature between about 600° and 700° C. for at least about 20 minutes to convert the clay into the reactive amorphous form; and thereafter reacting the body in an aqueous reactant mixture having in the aggregate a composition including said clay but exclusive of the added sodium zeolite A, expressed in terms of oxide mol ratios within the range of:

$Na_2O/SiO_2$ ---------------------------------- 0.8–1.4
$SiO_2/Al_2O_3$ ---------------------------------- 1.8–2.2
$H_2O/Na_2O$ ---------------------------------- 30–60 at reaction temperature between about 20° C. and 100° C. until additional crystals of sodium zeolite A are produced in said body.

2. A method for producing crystalline zeolite A in a preformed body, comprising the steps of providing a first mixture consisting essentially of finely-divided non-reactive kaolin-type clay and from about 33 to 67 percent, based on the weight of dry mixture, of finely-divided sodium zeolite A; mulling said first mixture for a period of between about 10 and 200 minutes; rapidly adding sufficient water to the mulled first mixture to provide a second mixture having between about 34 and 40 wt. percent water; mulling said second mixture for a period of at least about 10 minutes, the ratio of the first mulling time to the second mulling time being at least about 0.25:1 and the combined first and second mulling times being less than about 4 hours; forming the mulled second mixture into a compact body; heating said body at temperature between about 600° and 700° C. for at least about 20 minutes to convert the clay into the reactive amorphous form; and thereafter reacting the body in an aqueous reactant mixture having in the aggregate a composition including said clay but exclusive of the added sodium zeolite A, expressed in terms of oxide mol ratios within the range of:

$Na_2O/SiO_2$ ---------------------------------- 0.8–1.4
$SiO_2/Al_2O_3$ ---------------------------------- 1.8–2.2
$H_2O/Na_2O$ ---------------------------------- 30–60 at reaction temperature between about 20° C. and 100° C. until additional crystals of sodium zeolite A are produced in said body.

3. A method according to claim 2 in which said first mixture is mulled for a period of between about 60 and 100 minutes.

4. A method according to claim 2 in which said second mixture is mulled for a period of between about 15 and 25 minutes.

5. A method according to claim 2 in which said first mixture is mulled for a period of between about 60 and 100 minutes, sufficient water is added to the mulled first mixture to provide a second mixture having about 37% by weight water, and said second mixture is mulled for a period of between about 15 and 25 minutes.

6. A method according to claim 2 in which said first mixture contains less than about 26 wt. percent water.

7. A method according to claim 2 in which said first mixture contains about 20–22 wt. percent water.

8. A method for producing crystalline zeolite A in a preformed body, comprising the steps of providing a first mixture consisting essentially of finely-divided non-reactive kaolin-type clay and about 50 percent, based on the weight of dry mixture, of finely-divided sodium zeolite A; mulling said first mixture for a period of between about 60 and 100 minutes; rapidly adding sufficient water to the mulled first mixture to provide a second mixture having about 37% by weight water; mulling said second mixture for a period of between about 15 and 25 minutes; forming the mulled second mixture into a compact body; heating said body at temperature of between about 650° and 700° C. for about 30 minutes to convert the clay into the reactive amorphous form; reacting the heated body in an aqueous reactant mixture having in the aggregate a composition, including said clay but exclusive of the added sodium zeolite A, expressed in terms of oxide mol ratios, as follows:

$Na_2O/SiO_2$ ---------------------------------- About 1.4.
$SiO_2/Al_2O_3$ ---------------------------------- About 2.
$H_2O/Na_2O$ ---------------------------------- About 40.

maintaining the reactant mixture at a digestion temperature of between about 40° C. and 50° C. for a period of between about 2 and 3 hours, thereafter maintaining the digested reactant mixture at a crystallization temperature in the range of about 80° C. to 90° C. for a period between about 4 and 5 hours to crystallize additional zeolite A in said body; recovering and washing said body; and drying and activating the washed body.

9. A preformed zeolite A body prepared by the steps of providing a first mixture consisting essentially of finely-divided non-reactive kaolin-type clay and from about 33 to 67 percent, based on the weight of dry mixture, of finely-divided sodium zeolite A; mulling said first mixture for a period of between about 10 and 200 minutes; rapidly adding sufficient water to the mulled first mixture to provide a second mixture having consistency such that it is formable into a compact body; mulling said second mixture for a period of at least about 10 minutes, the ratio of the first mulling time to the second mulling time being at least about 0.25:1 and the combined first and second mulling times being less than about 4 hours; forming the mulled second mixture into a compact body; heating said body at temperature between about 600° and 700° C. for at least about 20 minutes to convert the clay into the reactive amorphous form; and thereafter reacting the body in an aqueous reactant mixture having in the aggregate a composition, including said clay but exclusive of the added sodium zeolite A, expressed in terms of oxide mol ratios within the range of:

| | |
|---|---|
| $Na_2O/SiO_2$ | 0.8–1.4 |
| $SiO_2/Al_2O_3$ | 1.8–2.2 |
| $H_2O/Na_2O$ | 30–60 | at reaction temperature between about 20° C. and 100° C. until additional crystals of sodium zeolite A are produced in said body.

10. A preformed zeolite A body prepared by the steps of providing a first mixture consisting essentially of finely-divided non-reactive kaolin-type clay and from about 33 to 67 percent, based on the weight of dry mixture, of finely-divided sodium zeolite A; mulling said first mixture for a period of between about 10 and 200 minutes; rapidly adding sufficient water to the mulled first mixture to provide a second mixture having between about 34 and 40 wt. percent water; mulling said second mixture for a period of at least about 10 minutes, the ratio of the first mulling time to the second mulling time being at least about 0.25:1 and the combined first and second mulling times being less than about 4 hours; forming the mulled second mixture into a compact body; heating said body at temperature between about 600° and 700° C. for at least about 20 minutes to convert the clay into the reactive amorphous form; and thereafter reacting the body in an aqueous reactant mixture having in the aggregate a composition, including said clay but exclusive of the added zeolite A, expressed in terms of oxide mol ratios within the range of:

| | |
|---|---|
| $Na_2O/SiO_2$ | 0.8–1.4 |
| $SiO_2/Al_2O_3$ | 1.8–2.2 |
| $H_2O/Na_2O$ | 30–60 | at reaction temperature between about 20° C. and 100° C. until additional crystals of sodium zeolite A are produced in said body.

11. A preformed zeolite A body prepared by the steps of providing a first mixture consisting essentially of finely-divided non-reactive kaolin-type clay and about 50 percent, based on the weight of dry mixture, of finely-divided sodium zeolite A; mulling said first mixture for a period of between about 60 and 100 minutes; rapidly adding sufficient water to the mulled first mixture to provide a second mixture having about 37% by weight water; mulling said second mixture for a period of between about 15 and 25 minutes; forming the mulled second mixture into a compact body; heating said body at temperature of between about 650° and 700° C. for about 30 minutes to convert the clay into the reactive amorphous form; reacting the heated body in an aqueous reactant mixture having in the aggregate a composition, including said clay but exclusive of the added sodium zeolite A, expressed in terms of oxide mol ratios, as follows:

| | |
|---|---|
| $Na_2O/SiO_2$ | About 1.4. |
| $SiO_2/Al_2O_3$ | About 2. |
| $H_2O/Na_2O$ | About 40. | maintaining the reactant mixture at a digestion temperature of between about 40° C. and 50° C. for a period of between about 2 and 3 hours, thereafter maintaining the digested reactant mixture at a crystallization temperature in the range of about 80° C. to 90° C. for a period between about 4 and 5 hours to crystallize additional zeolite A in said body; recovery and washing said body, drying and activating the washed body.

References Cited
UNITED STATES PATENTS

| | | | |
|---|---|---|---|
| 2,973,327 | 2/1961 | Mitchell et al. | 252—455 |
| 3,065,054 | 11/1962 | Hayden et al. | 252—455 |
| 3,119,660 | 1/1964 | Howell et al. | 23—112 |

DANIEL E. WYMAN, *Primary Examiner.*

C. F. DEES, *Assistant Examiner.*